Aug. 30, 1966     V. G. SHAW     3,269,255
MULTI-RANGE TEMPERATURE MEASURING APPARATUS
Filed Nov. 20, 1961
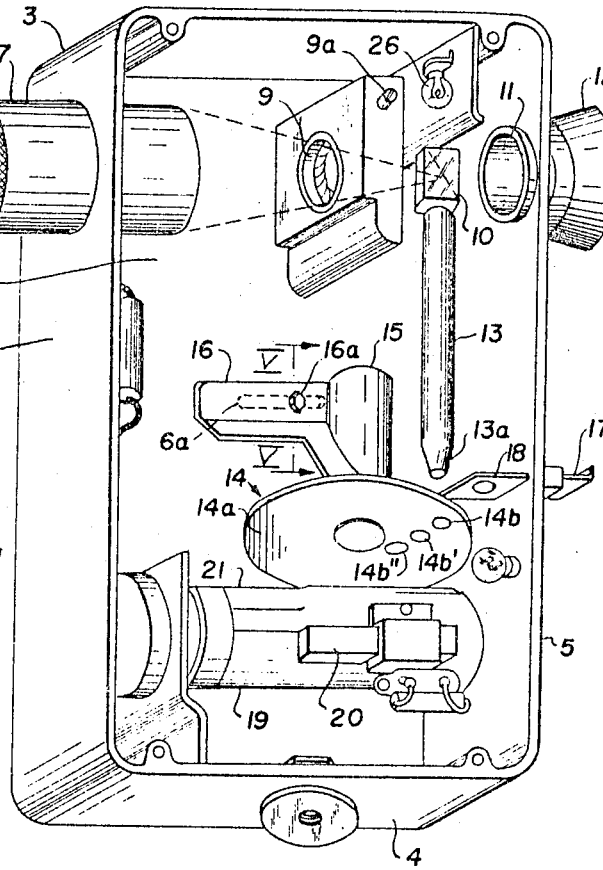
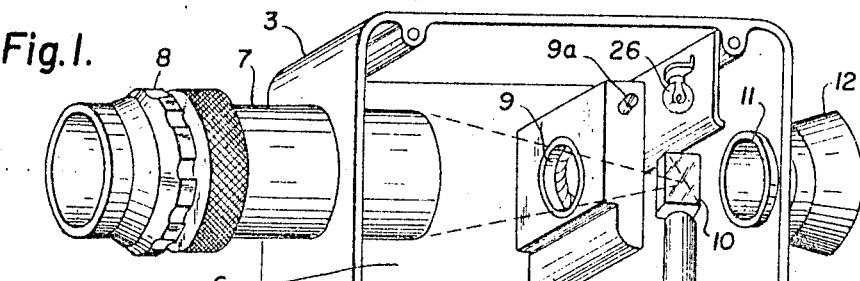
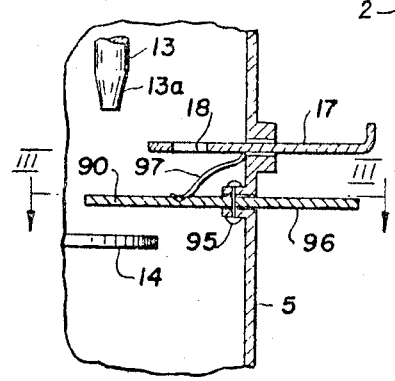
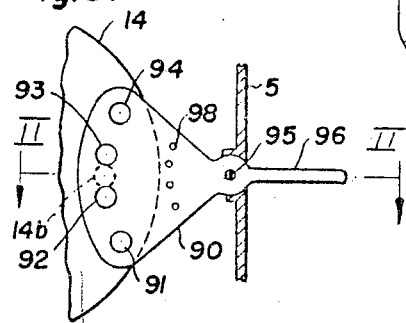
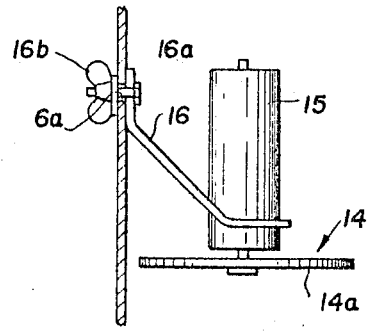
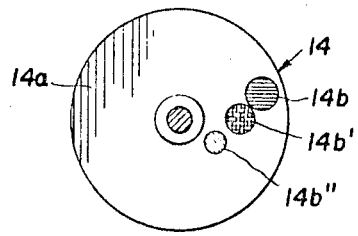
INVENTOR.
VINCENT G. SHAW
BY Christy, Parmelee, & Strickland
his ATTORNEYS United States Patent Office 3,269,255
Patented August 30, 1966

3,269,255
MULTI-RANGE TEMPERATURE MEASURING
APPARATUS
Vincent G. Shaw, Unity Township, Westmoreland County, Pa., assignor to Latronics Corporation, Latrobe, Pa., a corporation of Pennsylvania
Filed Nov. 20, 1961, Ser. No. 153,598
2 Claims. (Cl. 88—22.5)

This application is a continuation-in-part of my copending application Serial No. 121,677 for Sensing Head for Optical Temperature Measuring Apparatus, filed July 3, 1961, now Patent No. 3,195,398, which is assigned to the same assignee as is the present application.

The instant invention relates to a multi-range temperature measuring apparatus, and, more particularly, to an apparatus having a sensing head provided with a rotating disk with a plurality of filters of different colors for varying the temperature range to which the instrument may respond.

An optical pyrometer of the general nature of the present invention is disclosed in my above-mentioned copending application to include a photo-multiplier tube housed within a portable box or camera-like device, termed a "sensing head." In addition to the photo-multiplier tube, which is housed in an enclosure capable of maintaining a constant temperature about the tube, this head has a lens for receiving light from an external source and for transmitting it through a light pipe to the photomultiplier tube. There is a rotating disk in the sensing head between the lens and the photo-multiplier tube having at least two color areas or filters that are alternately brought by rotation of the disk between the lens and the photo-multiplier tube. There is connected into the anode of the photo-multiplier tube a circuit for reducing the voltage across the anode and cathode as the overall light intensity increases, and increasing it as the intensity decreases with a cut-off when the light energy falls below a predetermined level. The purpose of so-regulating the photo-multiplier tube voltage is to make the instrument insensitive to variations in overall light intensity, as when the instrument approaches or recedes from the light source. This regulatory circuitry, however, is too slow in its response to eliminate the pulsations or rise and fall of the voltage as one color filter and then the other passes in rapid succession across the light path to the photo tube, and these pulsations are amplified and registered on a peak reading voltmeter, which is calibrated in terms of temperature.

In the apparatus the enclosure for the photo-multiplier tube, the two color filters and the driving motor resembling generally a camera, is connected through a flexible cable to an instrument casing which houses the power pack for the apparatus, the control circuits, and amplifying and voltmeter circuits, so that this enclosure or sensing head may be moved about or set on a tripod while the heavy instrument case may remain relatively fixed.

It is to the sensing head that the present invention is particularly directed, and, more specifically, this invention relates to the rotating disk structure of the sensing head. A disk is provided which has a plurality of differently colored filters orbitally located with each at different radial distances and the disk and its drive motor are mounted such that for each given range of temperature readings one of the filters is moved in the light path emanating from the light pipe; that is, the disk and motor are movable relative to the light pipe axis.

An object of the invention is to provide a rotating disk filter which may present selective color filters to a light path such that different temperature range readings may be taken of a heating emitting body.

Another object is the provision of a rotating disk filter for a multi-color optical pyrometer to raise or decrease selectively the temperature range to which the instrument will respond.

An optical pyrometer illustrating certain features of the present invention may include a lens system having an adjustable iris, a beam splitter, a light pipe, a photomultiplier tube disposed to receive light transmitted through the pipe, and a rotating filter disk of a uniform color with a plurality of filters at different radii on the disk, each filter being of a different color and all being of a different color than the disk uniform color. The differently colored filters may be moved with the disk selectively between the pipe and the photomultiplier tube in the path of light directed by the pipe toward the tube to vary the temperature range to which the apparatus will respond.

A complete understanding of the invention may be had from the following detailed description of a specific embodiment thereof when read in conjunction with the appended drawings, wherein:

FIG. 1 is a somewhat schematic view showing the sensing head in perspective with one of the sides thereof removed and part of it broken away to show more of the inside structure, and with much of the internal apparatus schematically shown;

FIG. 2 is a fragmentary vertical section in the approximate plane of line II—II of FIG. 3 showing a still further modification of the instrument;

FIG. 3 is a fragmentary horizontal section in the plane of line III—III of FIG. 2;

FIG. 4 depicts in plan view the disk of the instrument showing filters inserted therein; and FIG. 5 shows a cross-section along line V—V of FIG. 1 illustrating in particular the bracket for adjusting the disk location.

Referring to the drawings, and first to FIG. 1, the sensing head comprises a camera-like box of generally rectangular shape, the width of which is narrow compared to its height and length. It has a front wall 2, a top 3, a bottom 4, a rear wall 5, a fixed side 6, and the other side is removable for access to the interior. In the drawings, the box is shown without the removable side panel.

Mounted on the front wall 2 near the top of the box is a lens tube 7 with a lens mount 8 thereon, the lens in the mount not being shown. This lens directs outside light from a source toward which the device is pointed through an iris 9 of the type commonly used in cameras, and which may have an adjusting handle 9a accessible from the outside of the head, as will be readily understood by those skilled in the art, or which may be adjusted by removing the side panel of the apparatus. The light which passes through the iris passes into a beam splitter 10, which is also well known in optical fields, and which includes prisms so arranged that part of the entering light passes straight through the beam splitter to a viewing opening 11 in the rear wall 5. There is an eye-piece 12 projecting from the rear of this opening, and there may be a correcting lens in the eye-piece, as is also well understood in the optical arts, to restore any image to its correct attitude after inversion in the preceding optical system. This opening 11 and eye-piece 12 are in axial alignment so that one may aim the instrument directly toward an object to be examined by looking through the eye-piece.

The other part of the split light beam falls on the top end of a light pipe 13, which may be a round rod of clear plastic. The lower end 13a of the light pipe is preferably an inverted truncated cone, that is, it tapers downwardly to a smaller diameter. The lower end of the light pipe terminates above a rotating filter disk 14. This disk is driven at high speed by a motor 15.

A bracket 16 having a stud 16a fixed on bracket 16 passing through an elongated slotted opening 6a through the closed side panel 6 of the casing supports the motor and disk assembly for rectilinear adjustment with respect to the light path between the light pipe 13 and a photo-multiplier tube. A wing nut 16b is provided on the exterior of the side panel 6 for releasably clamping the bracket 16 in a position to which it is adjusted. The bracket 16 may have sufficient area to cover the slot 6a in any position to which the disk is adjusted.

The disk is comprised of a uniform light transmitting area 14a for the light waves in the rod color band of frequencies, for example. The smaller filters 14b, 14b' and 14b'' selectively transmit therethrough bands of light of the colors distinct from the red uniform area, i.e., each filter passes light of a particular color such as yellow, green, and blue. The filter color alternately appears in the light path with the color of the uniform filter area 14a, and the light wave frequencies impinging on the phototube are representative of the light waves from a heated body as modified by the disk red filter area and the one chosen color filter 14b, 14b' or 14b''.

The diameters of the filters 14b, 14b' and 14b'' progressively decrease in proportion to their nearness to the center of the disk 14 to compensate for the change in angular velocity of the disk zones rotated in the path of light. The modulation frequency of the light accordingly remains the same for the different colors of segments when rotated to select the spectral quality of the light transmitted from the lens system of the device to the photo-multiplier tube. For example, the durations of presence of a yellow segment and the red uniform disk area in the light path for each revolution of the disk is the same as the durations of presence of a green segment and the red uniform disk area in the light path at a different radii of the disk but placed in the path of light by shifting the location of the disk relative to the light path. Thus, the output signal from a transducer on which the modulated light energy is directed remains the same in shape irrespective of the variation in angular velocity at different radii of the disk. In this manner the output is stabilized to the extent that the signal does not interfere with the associated circuitry of the transducer, and the strength of the radiant energy passed by the contrasting filters is capable of easy measurement because the waveform produced clearly distinguishes the energy of one frequency band from the other. The required sensitivity of the measuring circuit is much less in this event.

The segments 14b, 14b' and 14b'' may be of the same area although at different radii when it is desired to have different periods of time for the appearance of the filters by the change in angular velocity resulting from the proximity of the filters to the center of the disk. In this manner the time function of a derived electrical wave form, depicting the light modulation by a filter alternately occurring across the light path with the uniform color area of the disk, will vary but the peak voltage of the wave form will remain the same as a rectangular wave form. However, the strength of the energy transmitted for measurement will in this case appear only for a brief period, and the instrument will require circuitry which is fast in response. In my device disclosed in U.S. Patent 3,006,242 of October 31, 1962, capacitors in a measuring circuit are used to balance out background noise which reduces the sensitivity of a voltmeter. Accordingly, unless the waveform were rectangular as defined and with the appearance of the filters across a light path of a substantial duration, the sensitivity of a measuring circuit would preclude the balancing out of instrument background noise.

By selectively moving the filters in the disk into or out of the path of light between the light pipe and the photo-multiplier tube 19 by adjustment of the bracket 16 on the casing 6, the temperature ranges of measurement are varied, since each filter 14b transmits only a selected color band of the spectrum.

In addition to the screen 18 that may be moved into and out of the light path between the light pipe and the rotating disk, there may be a selectively operable internal color changing screen. This is shown in FIGS. 2 and 3 where similar reference numerals have been used to designate corresponding parts. As here shown there is a support member 90 having a series of light passages numbered 91 to 94 therein. This member is in the form of a segment of a circle pivotally supported at 95 on the rear wall of the box, and it has an operating extension 96 at its outer end. This support is always in the light path between the photo-multiplier tube, it being here shown at a level below the screen 18 and above the rotating disk 14. It is moved by operation of the handle 96 so that one of the light passages 91, 92, 93 or 94 is centered under the transmitting end of the light pipe. A spring detect 97 cooperating with the indentations 98 in the support holds it in any position to which it may be moved, the detect mechanism here shown being merely an illustration of a holding means for preventing the shutter from free movement.

The light passage 91 may be entirely open, while the passages 92, 93 and 94 may contain different color screens, as for example different shades or intensities of yellow. If the selected area 14a and the selected filter 14b, 14b' or 14b'' are red and blue, respectively, and a yellow passage 92 is projected into the light path, then the combined effect of the blue and yellow will be to pass light in the green band of the spectrum to the photo-multiplier tube, while the yellow and red will modify the red area of the spectrum to which the photo-multiplier tube is exposed. This may be useful in raising the temperature range to which the instrument will respond. With one of the other colors offered by the filters 14b, 14b', 14b'' the instrument will respond to a lower temperature range, for example. Where the energy in the entering beam of light is quite intense, it may be desirable to use the screen or filter 18 merely to reduce the effect of the light upon the photo-multiplier tube, or the screen 18 may be used in conjunction with one of the light passages 92, 93 or 94. In order words, 92, 93 and 94 may be complementary to 18.

At times it may be desirable to make a quick check of the instrument. To do this a cap is put over the lens tube to exclude light and the incandescent lamp 26 is energized. The operating temperature of the filament of the lamp has been previously determined. The light from the lamp is transmitted through the light pipe and through the filter disk into the photo-multiplier tube. If the instrument is working properly, the indicator should indicate a temperature corresponding to the known temperature of the lamp filament. This is not an entirely foolproof test, but can be relied upon to show that the instrument is functioning in all respects.

While I have shown certain particular constructions for the sensing head, it will be understood that the parts may be otherwise constructed and arranged within the contemplation of my invention and under the scope of the following claims.

I claim:

1. A sensing head for an instrument of the class described comprising a box, a lens tube on the box opening into the box, an eye-piece on the box opening into the box opposite the lens tube, a beam splitter in the box interposed between the lens tube and the eye-piece arranged to enable part of the light entering the box through the lens tube to pass directly to the eye-piece whereby the instrument may be aimed by looking through the eye-piece and lens tube to the object to be observed, a light pipe at right angles to the line of sight from the eye-piece through the lens tube, the beam splitter and light pipe being arranged to transmit part of the entering light from the lens tube into the light pipe, a photo-multiplier tube and enclosure therefor in the box, the light-sensitive area of said tube being in the path of light transmitted by the light pipe, a filter disk mounted for rotation in the box between the light pipe and the photo-multiplier tube and in the path of light transmitted from the pipe, the disk being of a uniform color for passing a band frequency of light energy within that color of the spectrum and having independent filters of different colors for passing selected band frequencies of light energy, each independent filter being positioned orbitally within the disk at a radial distance such that the rotation of the disk between the light pipe and photo-multiplier tube alternately passes light energy from the pipe to the photo-multiplier tube of a band frequency within the uniform color band of the spectrum and the color band of only one of the independent filters for each revolution of the disk, means for positioning the disk for selectively positioning one of the orbital independent filters in the light path between the pipe and photo-multiplier tube for rotation, and means in the box for rotating the disk.

2. A sensing head for an instrument of the class described as defined in claim 1 wherein the disk independent orbital filters are circular and of progressively decreasing diameters toward the axis of rotation of the disk whereby the ratio of the time of appearance between the pipe and photo-multiplier tube of each orbital filter to that of the associated uniform color area of the disk is maintained constant.

References Cited by the Examiner

UNITED STATES PATENTS

| | | |
|---|---|---|
| 1,898,219 | 2/1933 | Sharp. |
| 2,674,155 | 4/1954 | Gibson _____ 88—22.5 |
| 2,759,392 | 8/1956 | Sweet _____ 88—22.5 X |
| 3,044,349 | 7/1962 | Watrous _____ 88—22.5 |

FOREIGN PATENTS 207,682   2/1960   Austria.

OTHER REFERENCES

Blum: Recording Optical Pyrometer, The Review of Scientific Instruments, vol. 30, No. 4, April 1959, pages 251–253.

JEWELL H. PEDERSEN, *Primary Examiner.*

T. L. HUDSON, *Assistant Examiner.*